United States Patent [19]
Lundberg

[11] 3,963,337
[45] June 15, 1976

[54] STILL PROJECTOR WITH SINGLE-ACTING COMPENSATION DEVICE

[75] Inventor: Jan Agnar Lundberg, Torslanda, Sweden

[73] Assignee: Fritz Victor Hasselblad, Goteborg, Sweden

[22] Filed: May 12, 1975

[21] Appl. No.: 576,365

[30] Foreign Application Priority Data
May 21, 1974 Sweden............................ 7406706

[52] U.S. Cl................................ 353/70; 353/101; 353/87
[51] Int. Cl.²....................................... G03B 21/00
[58] Field of Search............... 353/70, 69, 101, 87; 352/93, 94, 140, 105, 109, 110

[56] References Cited
UNITED STATES PATENTS
1,952,522    3/1934    Warmisham.......................... 353/70
2,679,784    6/1954    Simmon............................. 353/101

Primary Examiner—Harry N. Haroian
Attorney, Agent, or Firm—Sherman & Shalloway

[57] ABSTRACT

In order to compensate for the "Keystone-effect," a still projector is equipped with a vertically adjustable lens holder, which is coupled by a sliding pivot to a pivotable lamp housing. The lamp housing has a pair of arms projecting therefrom, which have slots extending therein which, in turn, register with pins positioned in the lens holder. The pins are located adjacent the rear nodal plane of the lens, and are aligned with an axis, which intersects the optical axis of the lens. Upon adjusting the holder vertically, the lamp housing will tilt to insure that the projected image will angularly conform to the original.

6 Claims, 7 Drawing Figures

STILL PROJECTOR WITH SINGLE-ACTING COMPENSATION DEVICE

BACKGROUND OF THE INVENTION

1. Field of the Invention

This invention relates to still projectors, preferably to such equipped with interchangeable lenses, and more particularly, this invention relates to a still projector provided with a compensation device acting in vertical direction compensating for the so-called Keystone-effect.

2. Technical Considerations and Prior Art

The compensation device, of which the basic design is known per se, includes means for moving a lens of a still projector perpendicular to its optical axis in a vertical direction, a lighting means, pivotal in vertical direction, about the centre of a transparent original, and means for automatically directing the lighting means toward the exit pupil of the lens.

When a transparent original is projected onto a projecting screen by a projector, the lens of which is movable only in axial direction for focusing, the image projected on the projecting screen angularly conforms, when the projection takes place according to the normal situation, i.e., when normals through the centres of the transparent original and the projected image coincide. In other projection cases, said normals form angles with each other, which results in an angularly nonconforming projection of the transparent original. In the case of vertical angle deviation from the normal case, the lateral edges of the projected image are not parallel relative to one another, and at horizontal deviation, the upper and lower edges of the image are not parallel with each other. This projection error is called Keystone-effect. Moreover, with high-speed lenses and relatively large deviation from the normal case, it is not always possible to focus the lens, so that a sufficient sharpness over the entire image plane is obtained.

When necessary or desirable, projectors can, in a known manner, be equipped with compensation devices neutralizing the Keystone-effect. A projector, equipped with such a compensation device, is provided with a lens, the angular field of which is substantially greater than that required for the image size at projection, according to the normal case. The lens is mounted, so as to be movable perpendicularly to its optical axis in at least one direction. The lighting means of the projector is rotatably mounted, with the centre of rotation in the centre of the transparent original, and coupled to a guide means disposed in the rear nodal plane of the lens. By moving the lens in parallel, it is possible, within the limits of its angular field, to correct for the Keystone-effect, and simultaneously, the lens guides the lighting means, so that it is automatically directed to the exit pupil of the lens, and the transparent original is lightened uniformly. Devices of this kind are usually provided on large film projectors for professional use, for example, as disclosed in the patent specifications U.S. Pat. No. 1,952,522 or Great Britain No. 614 473. Still projectors are very seldom equipped with such compensation devices, and if they are, the projectors are intended to be used for some special purpose, for example, for showing several originals overlapping each other, as is apparent from the disclosure of U.S. Pat. No. 3,036,496.

When showing transparent originals, local conditions seldom permit the projector and projecting screen be placed, so that the projection can take place according to the normal situation, without involving other disadvantages. For example, the projecting screen may be positioned uncomfortably for the observer, and the projector unsuitably positioned for operation. In many cases, therefore, a compromise is made by permitting a moderate Keystone-effect, in order to diminish or eliminate other disadvantages. A moderate Keystone-effect can be tolerated, when only one picture at a time is shown, as was most usually the case before the instant invention. The observer then can concentrate to this single picture, which is shown for a sufficiently long time, to enable the observer to look away from the angular errors in the picture. It has been for this reason that, heretofore, still projectors were not provided with compensation devices of the aforesaid kind. Furthermore, such devices would render the projectors larger and more expensive.

Another method of showing transparent originals, which has become increasingly usual, is to arrange for so-called multiple projection in which several projectors, usually three to seven, are used which quickly show different originals relative to one another, which are placed edge to edge according to a definite program on a projecting screen common to all originals, to thereby bring about a strong visual effect. However, the desired effect soon results in weariness and the observers become irritated when, due to the Keystone-effect, the lateral edges of the images match badly, and the deviation from the normal situation gives rise to partial blurring of the images. In view of the aforesaid difficulties in arranging a show of transparent originals, with projection according to the normal situation, it is, therefore, desirable that still projectors suitable for multiple projection are equipped with a device, which compensates for the Keystone-effect. The most frequent deviation from the normal case occurs when showing transparent originals, and the deviation most difficult to avoid is vertical deviation. In order not to render the projector unnecessarily expensive, it is, therefore, in most cases sufficient to restrict the device to compensate for vertical deviations from the normal case.

OBJECTS OF THE INVENTION

One object of the present invention is to provide a still projector, preferably intended for multiple projection, with a device which compensates for the Keystone-effect, wherein the device is in principle known per se, and acts in vertical direction, and includes a pivotal lighting means, as well as means for automatically guiding the same.

Another object of the present invention is to design a device which compensates for the Keystone-effect, wherein the device is simple to manufacture and reliable in use.

A further object of the present invention is to provide a device which compensates for the Keystone-effect, and does not unnecessarily increase the outer dimensions of the still projector.

SUMMARY OF THE INVENTION

The instant invention contemplates a still projector provided with a device for compensation of angular error caused by projection deviating from the normal situation, i.e., when normals through the center of the transparent original and, respectively, through the center of its projected image, do not coincide. The compensation device is restricted to angular deviations from the normal situation, which lie in a vertical plane.

BRIEF DESCRIPTION OF THE DRAWINGS

A preferred embodiment of the invention is described in greater detail in the following text, with reference to the accompanying drawings, in which.

Identical details in the different figures have been given the same reference characters.

DETAILED DESCRIPTION

Figure 1:
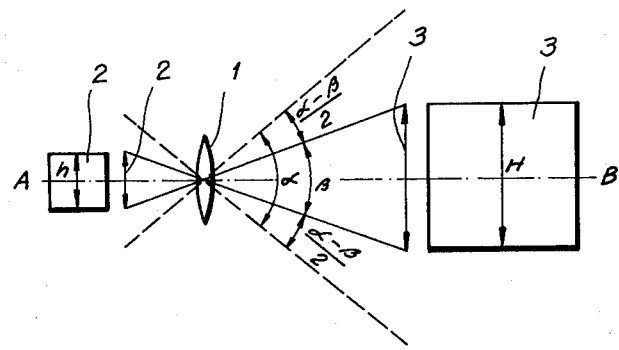
FIG. 1 is a schematic view, which shows the principle for projection according to the normal situation, with a known compensation device.
Figure 2:
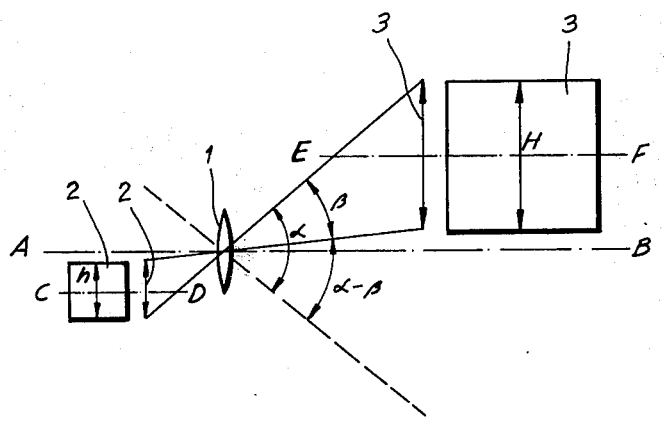
FIG. 2 is a schematic view, which corresponds to FIG. 1, but shows a projection situation deviating from the normal situation.

FIGS. 1 and 2 show, in a schematic way, the principle of a projector provided with a compensation device, of a kind known per se, to counteract the Keystone-effect. The ray path, through a lens 1 intended for the projector, is shown in the central portions of the figures. A transparent original 2 and a projected image 3, turned through 90°, are shown to the left and, respectively, right in the figures to make the size and angles of the original and image apparent. The lens 1 has an angular field $\alpha$, which is substantially larger than the angle $\beta$, required for projecting the transparent original 2. In FIG. 1, the normals, through the centers of the original and image 2 and 3, coincide with the optical axis A–B of the lens. This projection case is known as the normal case, in which the projected image 3 angularly conforms to the image of the transparent original 2.

As appears from FIG. 1, there is an angle $(\alpha-\beta)/2$ on each side of the angle $\beta$, within which area the lens 1 can be displaced in parallel, and still obtain a fully covering image 3. This is shown in FIG. 2, where the lens 1 is moved upward to a maximum, where the upper edge rays, limiting the angles $\alpha$ and $\beta$, coincide. The normals C–D and E–F, through the central points of the original 2 and respectively image 3, have thereby been displaced in parallel, in relation to the optical axis A–B. It can be seen, from FIG. 2, that the image 3 still is an angularly conforming image of the original 2, although it is a projection case or situation, deviating from the normal case or situation. No refocusing of the lens is required at the transition between the projection cases, shown in FIGS. 1 and 2. The depth of focus of the image 3 when deviating, as in FIG. 2, from the normal situation, does not involve any of the problems occurring in the deviation, illustrated by FIG. 3 and described hereinafter.

Figure 3:
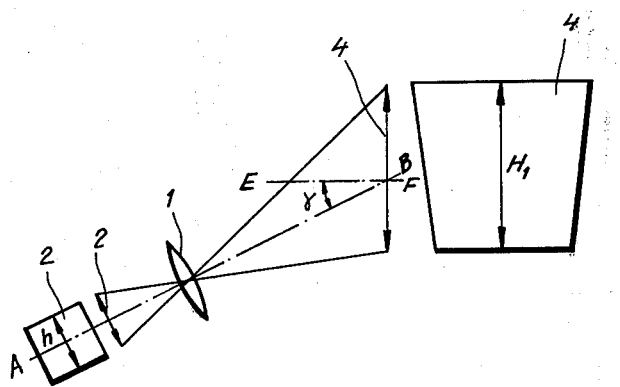
FIG. 3 is a schematic view, which shows a projection situation deviating from the normal situation, with a projector having no compensation device.

FIG. 3, when compared with FIG. 2, shows what will take place, when a projection deviates from the normal projection, when the lens 1 is moved in the axial direction only for focusing. The optical axis A–B forms an angle $\gamma$ with a normal E–F through a projected image 4. Because of the angular deviation $\gamma$ from the normal case, the image 4 is an angularly nonconforming image of the transparent original 2. At a height $h$ of the original 2, and a height H (FIG. 2) of the angularly conforming image H, the height of the angularly nonconforming image 4 will be $H_1$ (FIG. 3), wherein $H_1>H$. The lateral edges of image 4 will not be parallel, wherein with multiple projections, this either produces wedge-shaped overlappings or corresponding dark fields between adjacent images. When the angle $\gamma$ is relatively great, it often happens that the depth of focus is not sufficient for showing the entire image 4 with satisfactory sharpness. This disadvantage is eliminated entirely, in the parallel case shown in FIG. 2, because the surface of the entire image 3 lies in the focal plane of the lens 1.

The angular deviation $\gamma$, FIG. 3, amounts in practice usually to about 10° but may, in exceptional cases, be about 15°. In order not to unnecessarily render the still projector expensive and increase its dimensions, the compensation possibilities should preferably be limited to an angle about ±15° from the normal situation. The increases in cost and dimensions are then moderate.

Figure 4:
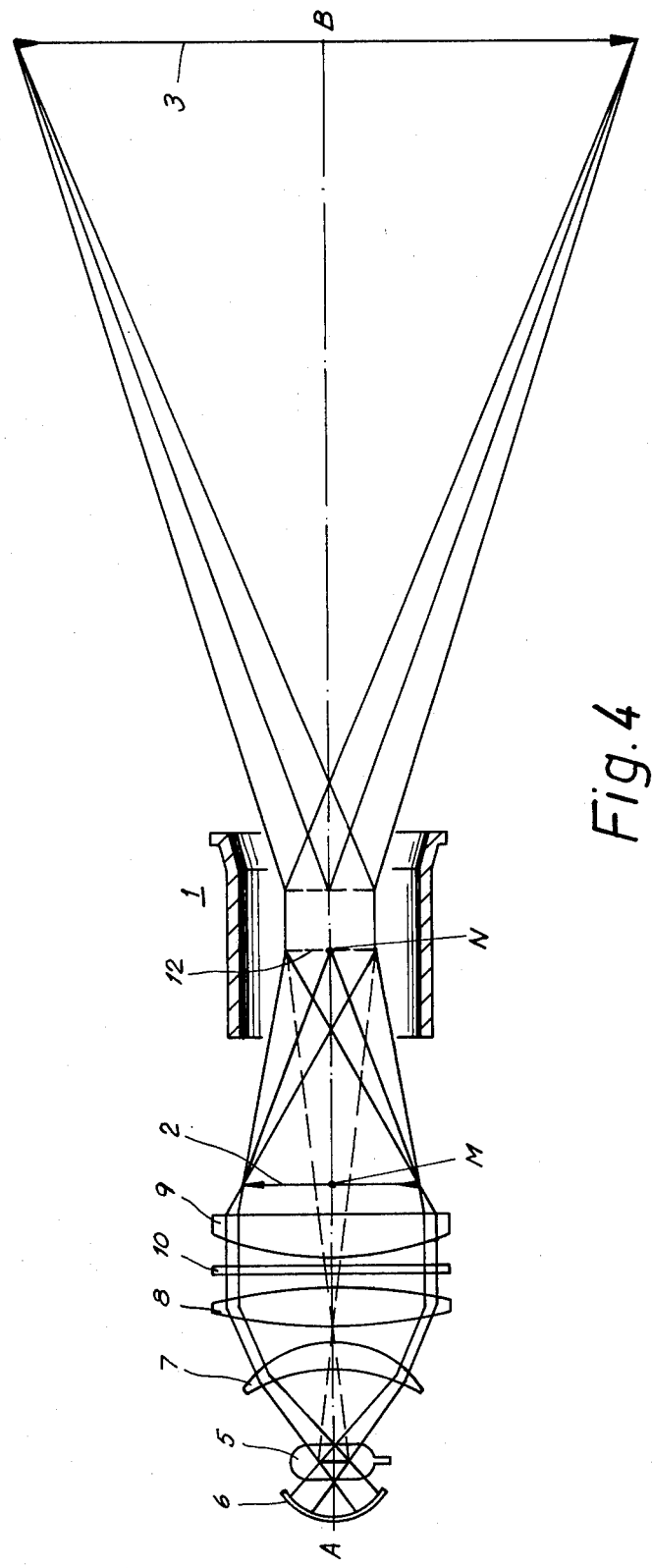
FIG. 4 is a side view, which shows the ray path in a device according to the invention, at projection according to the normal situation.
Figure 5:
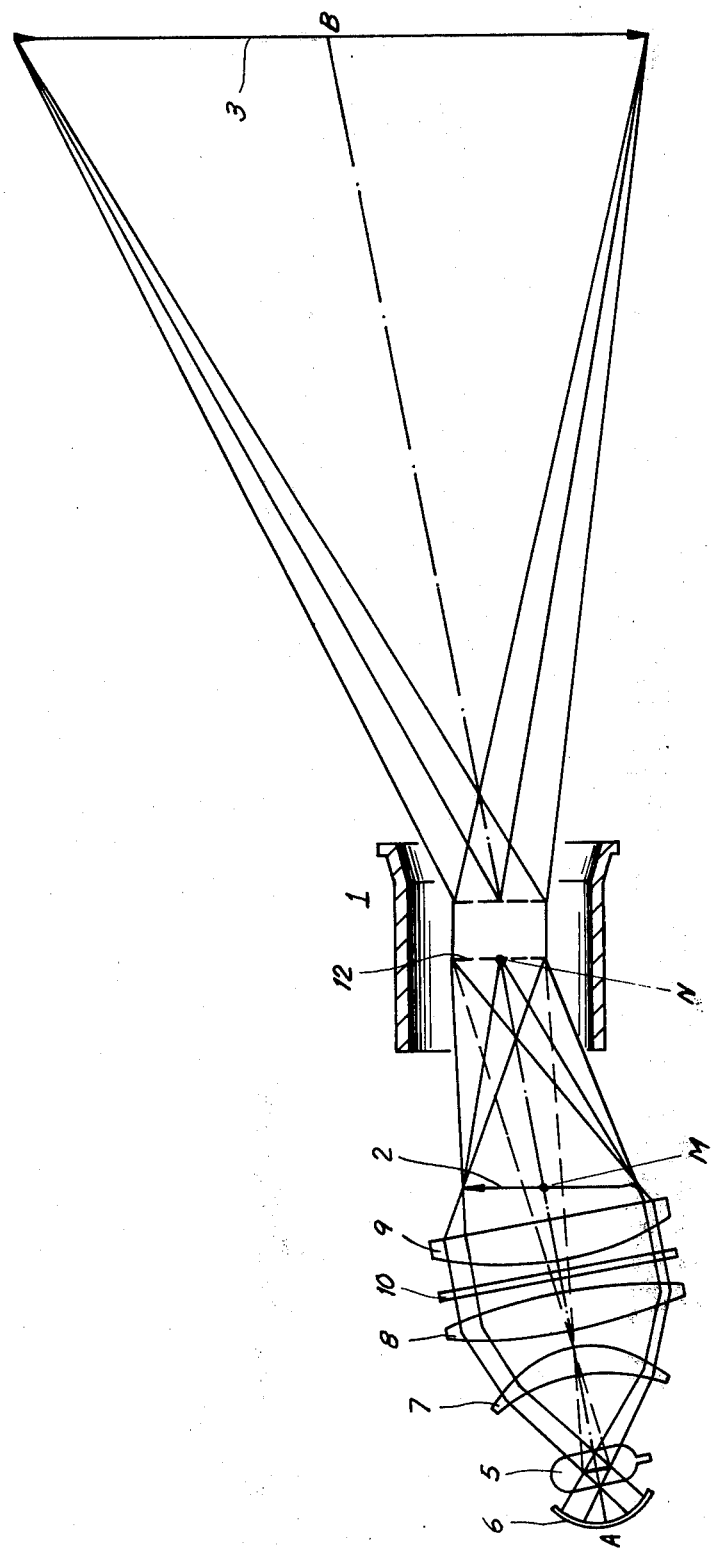
FIG. 5 corresponds to FIG. 4, but shows projection deviating from the normal case.

In FIGS. 4 and 5, the ray path, through a still projector, is shown provided with a compensation device, according to the instant invention. FIGS. 4 and 5 correspond to the projection situation, shown in FIGS. 1 and 2 respectively. The lighting means is, of known type and comprises a lamp 5, a spherically curved mirror 6, a three-lens condenser 7, 8 and 9, and a heat-absorbing filter 10 between the lens elements 8 and 9. The entire lighting means 5–10 is mounted rotatably in front of the transparent original 2, which rests in a fixed slide carrier 11, shown in FIGS. 6 and 7, which projects into the ray path of the forward lens element 9. The center of rotation is located in the center M of the transparent original 2, and the lighting means 5–10 is coupled together with guide means provided in the rear nodal plane 12 of the lens 1 at the level of the optical axis A–B, N in FIGS. 4 and 5. When the lens 1 is displaced in parallel to compensate for the Keystone-effect from the normal case shown in FIG. 4 to a position deviating from the normal case, FIG. 5, the lighting means 5–10, coupled to the lens 1, automatically will turn so that the ray path always is centered on the exit pupil of the lens 1, located in the rear nodal plane 12. The lighting means 5–10 is thereby utilized at maximum, and the image 3 is uniformly lightened. The beam of rays, emitted from the forward lens element 9, is convergent. Therefore, the distance between the forward lens element 9 and the transparent original 2 should be as short as possible, in order not to render the condenser 7, 8 and 9 unnecessarily large and expensive. Due to the fact that the lighting means 5–10, used with a still projector according to the invention, is pivotal about the center M of the fixed transparent original 2, the distance between the lens element 9 and the original 2 must be somewhat greater than with a projector with a fixed lighting means. This increase in distance is moderate, as is apparent from FIGS. 4 and 5, so that the resulting increase in size and costs for the lighting means 5–10 is small.

Figure 6:
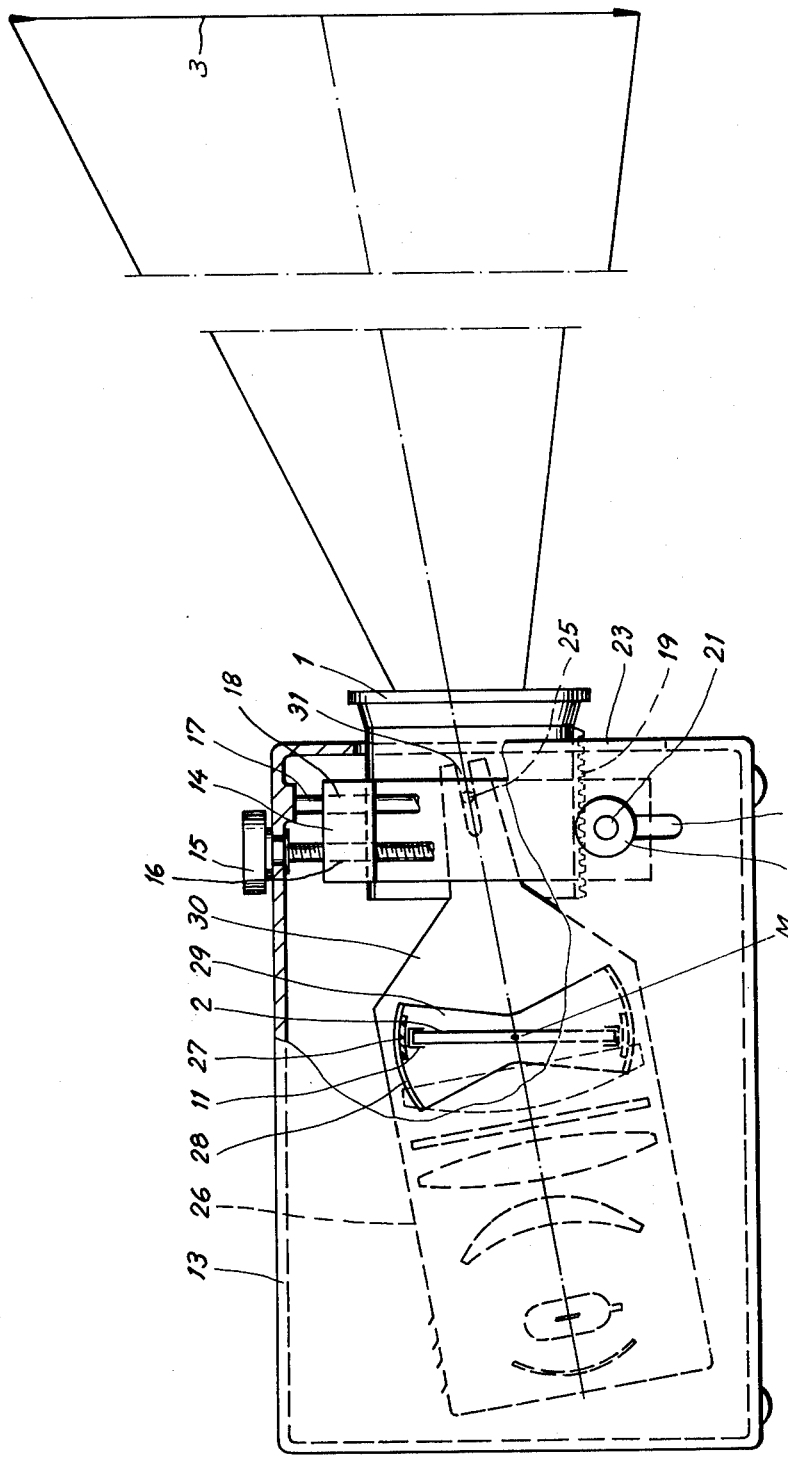
FIG. 6 is a side view of a still projector, according to the invention, partially in section.
Figure 7:
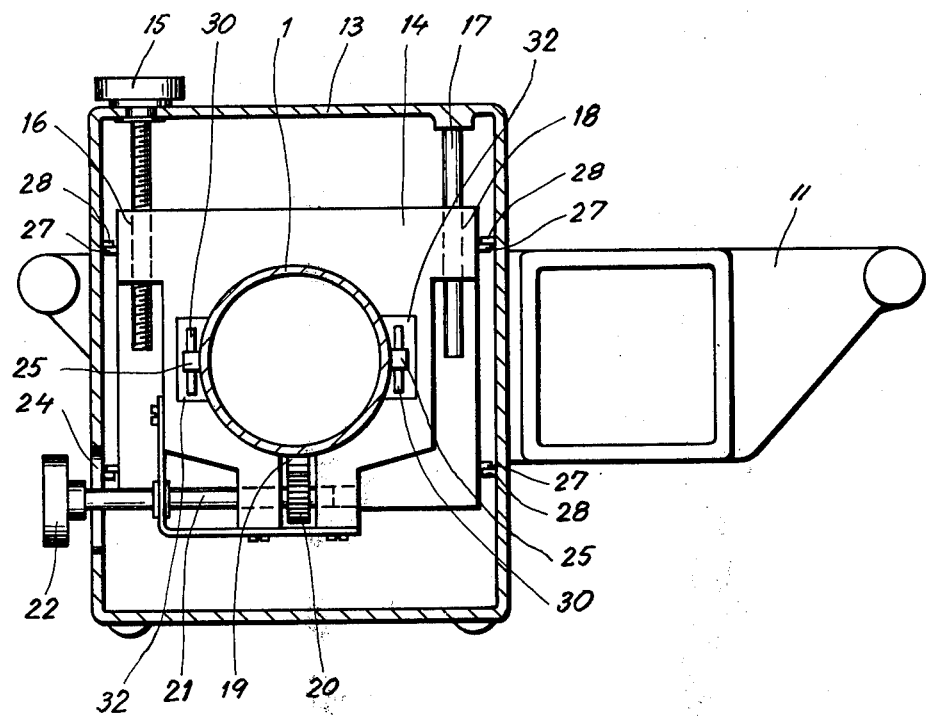
FIG. 7 is a front view of the still projector, according to FIG. 6, with its front plate cut away.

A preferred embodiment, of a still projector according to the invention, is shown in FIGS. 6 and 7. The interchangeable lens 1 is mounted in a projector housing 13 in a vertical tubular holder 14, which is suspended in the forward portion of the projector housing 13 by a set screw 15 rotatably supported in the housing, and screwed into a threaded hole 16 in one side of the upper portion of the lens holder 14. The holder 14 is parallel guided by means of a guide pin 17, which is fastened in the projector housing 13, and extends through an unthreaded hole 18 in the upper end of the holder 14 opposite to the set screw 15. The lens 1 is axially movable in the holder 14, and provided with a focusing means comprising a rack 19 secured on the lower side of the lens 1, and meshing with a gear wheel 20 attached to an axle 21 rotatably supported in the holder 14. The axle end projecting out of the projector housing 13 is provided with a fixed focusing wheel 22. In order to allow the vertical movement of the lens 1, the respective holes 23 and 24, in the projector housing 13 for the lens 1 and axle 21, are oblong in the motion direction. The holder 14 embraces the lens 1, so that its rear nodal plane 12 intersects the holder 14, FIGS. 4–5, and horizontal driving pins 25 are provided on the lens 1 in the rear nodal plane 12 on the level of the optical axis to guide the lighting means 5–10, in the manner described as follows.

A lamp housing 26, FIG. 6, including the lighting means 5–10, is suspended rotatably in the projector housing 13, and is rotatable about an imagined horizontal axis through the centre M in the plane of the transparent original 2. For this purpose, the lamp housing 26 is provided with two arc-shaped lateral projections 27 supported externally in fixed bearing cups 28 on the sides of the projector housing 13 (FIGS. 6 and 7). The lateral projections 27 are so spaced relative to each other, that between them there is room for the slide carrier 11, which is fixed in the sides of the projector housing 13, and also extends through lateral holes 29 in the lamp housing 26. The lateral holes 29, mountings 27, 28 and other details depending on the vertical motion of the lens 1, are so dimensioned that they permit the presupposed angular deviation of about ±15° from the normal situation.

In order to make it possible to turn the lamp housing 26 in response to the vertical setting position of the lens 1, and to automatically direct the light from the lighting means 5–10 to the exit pupil of the lens 1, located in the rear nodal plane, FIGS. 4 and 5, the sides of the lamp housing 26 are extended forward to form a pair of driving arms 30, FIG. 6. The forward free portion of each driving arm 36 has a forwardly opening fork groove 31, which embraces the respective driving pin 25 on the lens 1. As seen in FIG. 7, the driving arms 30 extend through recesses 32 in the lens holder 14. According to an alternative embodiment of the invention, guide means in the form of driving pin 25 and driving arms 30 are provided only on one side of the device, as is shown in FIG. 6.

For adjusting the projected image 3 to desired height, in relation to the projector housing 13, one needs only alternatively raise and lower the lens 1 by means of the set screw 15, whereby the lighting means 5–10, in the described manner, follows the lens 1. With a device according to the invention, the projector inclining means, generally associated with conventional projectors, is no longer required, which is an additional advantage.

I claim:

1. A still projector equipped with a device for compensating for angular errors caused by projection deviation from the normal in a vertical plane, wherein the device includes means for rendering possible vertical displacement of the lens of the still projector perpendicular to its optical axis, a lighting means pivotal in a vertical plane about the centre of a transparent original, and means for automatically directing the paraxial ray path of the lighting means to the rear nodal point of the lens, wherein the improvement comprises:
   a projector housing (13);
   a lens means having a rear model plane, a holder for said lens means (12), wherein said holder (14) is mounted in said housing (13);
   a set screw (15) rotatably supported in said housing (13) and threaded with said holder (14);
   guide means (17) registered with said holder (14) for limiting said holder (14) to vertical displacement upon rotating said set screw (15), in order to vertically displace said lens (1);
   a lamp housing (26) having sides and rotatably supported by the projection housing (13) for rotation about a horizontal axis located through the center (M) of the transparent original (2), in a plane defined by the original;
   lamp and optical means (5–10) mounted in said lamp housing for defining an optical axis (26);
   coupling means for coupling the lamp housing (26) to the holder (14), wherein said coupling means includes at least one driving arm (30), extending from said lamp housing (26), which engages said holder (14) with a sliding pivot means (25,31), wherein the axis (25) of said pivot is intersected by, and normal to said optical axis, and wherein the axis of said pivot means is in the rear nodal plane (12) of the lens means (1).

2. The still projector of claim 1, wherein the sliding pivot means (23,31) is formed by a slot (31) extending in said driving arm (30), and a pin (25) extending from said holder and in alignment with said axis of said pivot means.

3. The still projector of claim 2, wherein there is a pair of driving arms (30), each of which has a slot (31) registered with a pair of pins (25) extending in alignment with the axis of said pivot means.

4. The still projector of claim 3, wherein the driving arms (30) are integral with sides of the lamp housing (26), and extend through recesses (32) in the lens means holder (14).

5. The still projector of claim 1, characterized in that the mounting of the lamp housing (26) includes lateral arc-shaped projections (27), which are provided on the sides of the lamp housing and are rotatably supported in corresponding bearing cups (28) provided on the sides of the projector housing.

6. The still projector of claim 5, wherein the driving arms (30) are integral with sides of the lamp housing (26), and extend through recesses (32) in the lens means holder (14).

* * * * *

UNITED STATES PATENT AND TRADEMARK OFFICE
CERTIFICATE OF CORRECTION

PATENT NO. : 3,963,337
DATED : June 15, 1976
INVENTOR(S) : Jan Agnar Lundberg

It is certified that error appears in the above-identified patent and that said Letters Patent are hereby corrected as shown below:

Item 73, line 1, delete "Goteborg", insert -- Gothenburg --

Item 30, line 2, delete "7406706", insert -- 7406706-7 --

Claim 1, line 26, after "lamp" (first instance) insert -- means -

Signed and Sealed this

Fourteenth Day of September 1976

[SEAL]

*Attest:*

RUTH C. MASON
*Attesting Officer*

C. MARSHALL DANN
*Commissioner of Patents and Trademarks*